A. B. DRÄGER.
BATTERY FOR ABSORBING CARBONIC ACID SUCH AS USED IN BREATHING APPARATUS.
APPLICATION FILED MAR. 6, 1912.

1,085,674.

Patented Feb. 3, 1914.

Witnesses:
B. Dommers
E. Lickert.

Inventor,
Alexander Bernhard Dräger
By Henry Otto
Atty.

UNITED STATES PATENT OFFICE.

ALEXANDER BERNHARD DRÄGER, OF LÜBECK, GERMANY, ASSIGNOR TO DRÄGERWERK, HEINR. & BERNH. DRAGER, OF LÜBECK, GERMANY, A FIRM.

BATTERY FOR ABSORBING CARBONIC ACID SUCH AS USED IN BREATHING APPARATUS.

1,085,674. Specification of Letters Patent. Patented Feb. 3, 1914.

Application filed March 6, 1912. Serial No. 681,994.

*To all whom it may concern:*

Be it known that I, ALEXANDER BERNHARD DRÄGER, a subject of the German Emperor, and resident of Lübeck, in the German Empire, have invented a new and useful Improvement in Batteries for Absorbing Carbonic Acid Such as Used in Breathing Apparatus, of which the following is a specification.

The present invention aims to do away with existing drawbacks.

With this object in view the dishes or carriers of the chemical are provided with a plurality of openings, so constructed and arranged and of such size as to allow air to pass through or around the dish. These dishes are arranged one above the other with respect to their openings in a complementary position, so as to divide the air passing over the chemicals into several streams. The carriers may be so constructed, that they are all given the same shape or that each pair consists of dishes of varying shape.

I do not claim batteries having chemical carriers with openings, which are opposite one another, so as to form straight channels throughout the battery. In such devices the air cannot be led across the layers of chemicals in a plurality of streams, this can only be done, when the openings of the consecutive carriers are in a complementary position, as in the battery herein described.

Figure 1:
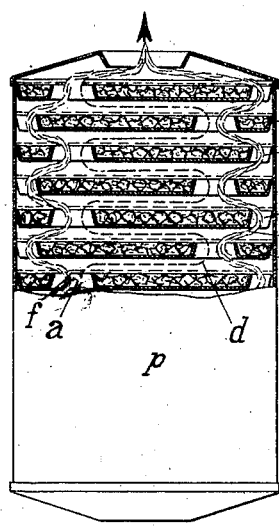
Figure 2:
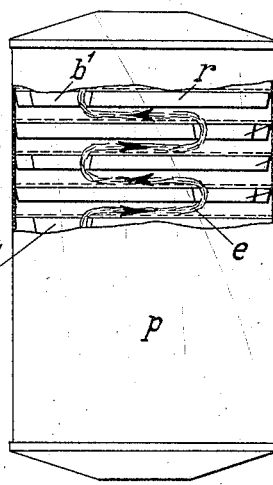
Figure 6:
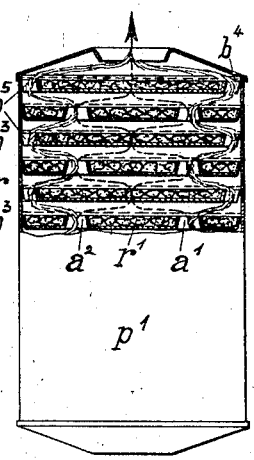
Figure 3:
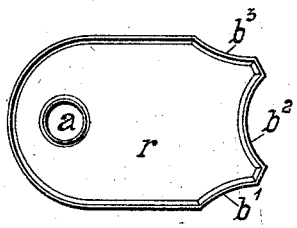
Figure 4:
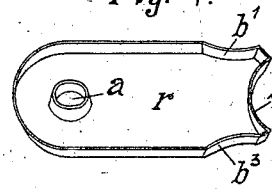
Figure 7:
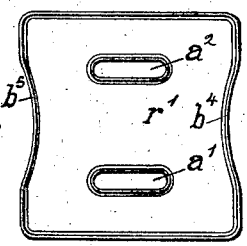
Figure 5:
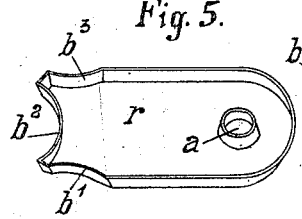
Figure 8:
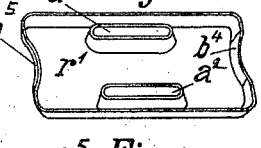
Figure 9:
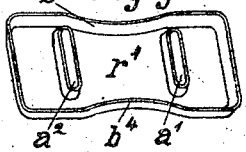

In the accompanying drawings Figure 1 shows a battery in elevation partly in section and Fig. 2 shows a similar view partly with the wall broken away. Fig. 3 is a plan of one of the carriers. Fig. 4 is a perspective view of a carrier and Fig. 5 is a similar view of a carrier turned end to end so as to form a pair, with the carrier shown in Fig. 4. Fig. 6 is a similar view to Fig. 1 showing a modification and Figs. 7, 8 and 9 are similar views to Figs. 3, 4 and 5 showing the dish belonging to this modification.

In the battery shown in Figs. 1 and 2 the carriers or dishes $r$ are all alike. They have approximately an oval shape and are provided at one end with an opening $a$, while the other end is so shaped, as to form three openings $b^1$, $b^2$ and $b^3$ together with the wall of the case $p$. These carriers are so arranged within the casing that the openings (for instance $a$) are alternately situated on the right and left hand side, thus each dish is turned end to end with respect to the next following. The carrier may be constructed to allow the air in passing to come into contact with the chemicals from underneath when the bottoms are perforated or made of wire netting as well as on top or only on top when the bottoms are imperforate.

The various ways the air can take, as indicated in Figs. 1 and 2 are as follows: Before coming in contact with the first carrier the air entering the case with a considerable velocity either by the upper or lower opening is divided into a number of streams. One stream $f$ passes through the opening $a$ arranged near one end of the first carrier, from there to the rim opening $b^2$ of the next carrier, from there to the opening $a$ of the third carrier and in the same manner through the whole battery. A second stream $c$ passes through the opening $b^2$ of the first carrier takes a similar way on the opposite ends of the carriers. The third stream $d$ of air passes through the opening $a$ of the first carrier, then through the opening $a$ of the second carrier and so on through all the openings $a$ of the carriers taking the course shown in dotted lines in Fig. 1. The fourth stream $e$ of air starts through the opening $b^1$ of the first carrier, then along the flat side of the same carrier to the opening $b^3$ of the second carrier and turning around along the flat side of the latter to the opening $b^1$ of the third carrier and so on taking the course shown in Fig. 2. Finally there is a fifth stream similar to $e$ on the other flat side of the battery by way of the openings $b^3$ and $b^1$ situated on that side.

The openings in the carriers are so positioned, that in all instances the molecules of the air, when passing from one opening of a carrier to that of another move an equal length of way, so that the purifying properties of the chemicals will take effect on all streams of air to the same degree.

At the other end of the battery the streams of air unite and leave the casing through its opening on this end. The size of the battery is so chosen that every molecule of air comes in contact a sufficient length of time and sufficiently often with chemicals to give up the carbonic acid impurities.

The velocity the air originally has, when entering the battery is considerably reduced within the battery on account of it being divided into a plurality of streams of considerable sectional area. Moreover the frictional resistance of the air, when passing through the battery, is also much reduced, owing to the ramification of the stream of air. When the air would be forced to pass over the total surface of all chemical layers one after the other in one single body of stream, the resistance offered to the air within the battery would be very much greater even though the distances the layers or carriers are arranged apart be the same. This resistance would be the greater on account of the speed being also greater.

The modification shown in Figs. 6-9 differs from the device described above inasmuch as the battery $p^1$ is given an approximately square cross section. The carriers $r^1$ are provided with two symmetrically arranged inner openings $a^1$ and $a^2$ and with two symmetrically arranged rim-openings $b^4$ and $b^5$. In this modification the carriers, which also are all alike, are however when placed one above the other $r^c$ turned end to end, but only turned at an angle of 90°. It is evident that by this construction also a plurality of air streams will be obtained, as may be gathered from Fig. 6.

What I claim is:

1. A battery for absorbing carbonic acid comprising a casing having an air inlet and an outlet, a series of shallow sheet-metal, superposed, spaced carriers all of the same size and shape and engaging the walls of the casing, each having a flanged aperture therethrough near one edge and an indentation in the opposite edge coöperating with the wall of the casing to form an air passage from the bottom to the top of the carrier, the aperture and indentation of one carrier being in opposite positions to those of the adjacent carrier, whereby a plurality of streams of air pass from one aperture of a carrier to a like aperture of an adjacent carrier through paths of equal length.

2. A battery for absorbing carbonic acid comprising a casing having an air inlet and an outlet, a series of shallow sheet-metal, superposed, spaced carriers all of the same size and shape and engaging the walls of the casing, each having a flanged aperture therethrough near one edge and an indentation in the opposite edge and an indentation on each side of the latter, said indentations coöperating with the wall of the casing to form separate air passages from the bottom to the top of the carrier, the aperture and indentations of one carrier being in opposite positions to those of the adjacent carrier, whereby a plurality of streams of air pass from one aperture of a carrier to a like aperture of an adjacent carrier through paths of equal length.

ALEXANDER BERNHARD DRÄGER.

Witnesses:
FRIEDRICH PLATH,
JOHS. WULF.